United States Patent [19]

Tell et al.

[11] Patent Number: 5,774,802
[45] Date of Patent: Jun. 30, 1998

[54] APPARATUS AND METHOD FOR BILLING IN A WIRELESS COMMUNICATION SYSTEM

[75] Inventors: Daniel Francis Tell, Lake Forrest; John M. Scanlon, N. Barrington; Marty H. Singer, Northbrook, all of Ill.; David A. Hose, Boulder, Colo.; James A. Fitch, Edmonds, Wash.

[73] Assignee: Motorola Inc., Schaumburg, Ill.

[21] Appl. No.: 631,688

[22] Filed: Apr. 10, 1996

[51] Int. Cl.[6] ................................................. H04Q 7/22
[52] U.S. Cl. .......................... 455/408; 455/456; 455/406
[58] Field of Search ............................... 379/58, 59, 112, 379/114, 63; 455/54.1, 33.1, 405, 406, 407, 408, 456, 457, 422

[56] References Cited

U.S. PATENT DOCUMENTS

| | | |
|---|---|---|
| 2,470,787 | 5/1949 | Nosker . |
| 3,787,862 | 1/1974 | Jacobson . |
| 3,806,937 | 4/1974 | Lindley . |
| 3,872,477 | 3/1975 | King . |
| 4,215,345 | 7/1980 | MacDoran . |
| 4,229,620 | 10/1980 | Schaible . |
| 4,297,701 | 10/1981 | Henriques . |
| 4,665,404 | 5/1987 | Christy et al. . |
| 4,698,781 | 10/1987 | Cockerell, Jr. . |
| 4,703,444 | 10/1987 | Storms, Jr. et al. . |
| 4,728,959 | 3/1988 | Maloney et al. . |
| 4,750,147 | 6/1988 | Roy, III et al. . |
| 4,751,512 | 6/1988 | Longaker . |
| 4,799,062 | 1/1989 | Sanderford, Jr. et al. . |
| 4,817,113 | 3/1989 | Lundquist et al. . |
| 4,888,593 | 12/1989 | Friedman et al. . |
| 4,965,732 | 10/1990 | Roy, III et al. . |
| 5,017,926 | 5/1991 | Ames et al. . |
| 5,045,861 | 9/1991 | Duffett-Smith . |
| 5,056,104 | 10/1991 | Ambrosi . |
| 5,099,248 | 3/1992 | Brommer . |
| 5,119,104 | 6/1992 | Heller . |
| 5,317,323 | 5/1994 | Kennedy et al. . |
| 5,327,144 | 7/1994 | Stilp et al. . |
| 5,404,376 | 4/1995 | Dent . |
| 5,465,289 | 11/1995 | Kennedy, Jr. . |

*Primary Examiner*—Dwayne Bost
*Assistant Examiner*—William G. Trost

[57] ABSTRACT

A method including the steps of receiving a mobile identification number identifying a mobile unit (36), performing a multilateration location measurement based on a nonperiodic signal received from the mobile unit (116), retrieving a location zone from a memory based on the mobile identification number (210), comparing the multilateration location measurement with the location zone, and generating a billing record for the mobile unit (214).

12 Claims, 6 Drawing Sheets

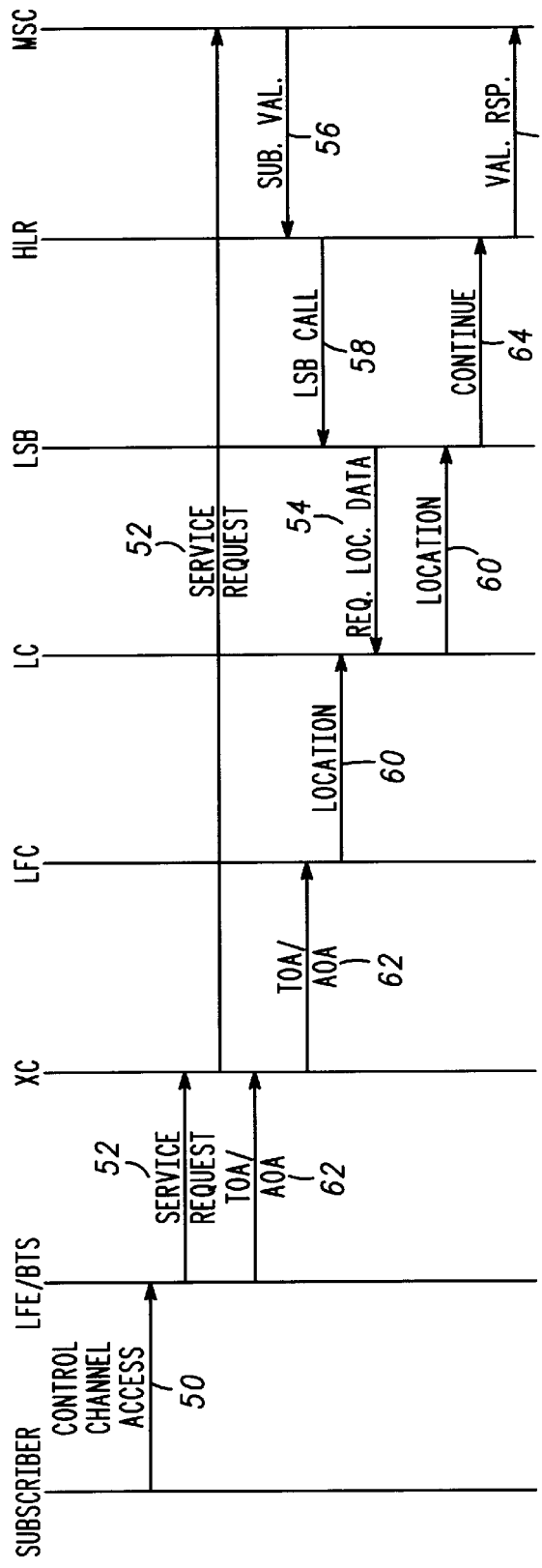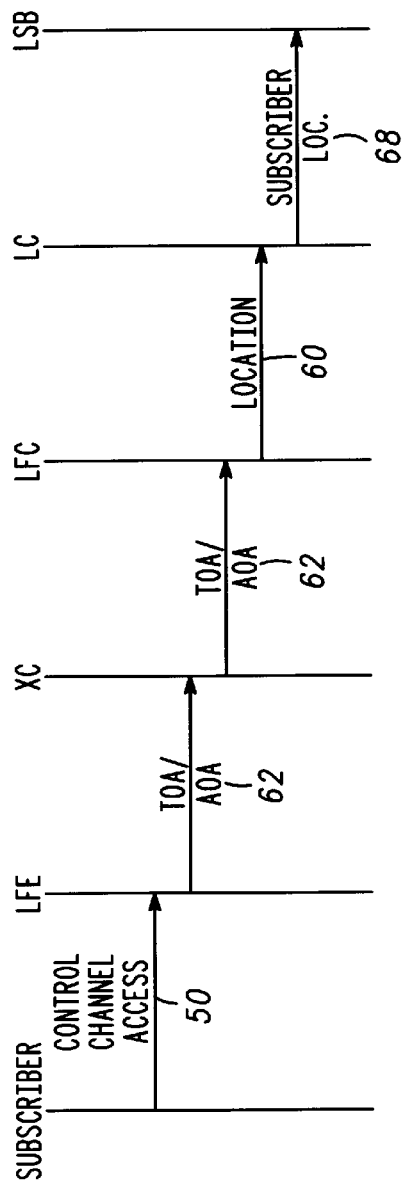
FIG. 2
FIG. 3

APPARATUS AND METHOD FOR BILLING IN A WIRELESS COMMUNICATION SYSTEM

FIELD OF THE INVENTION

This invention relates generally to wireless communication systems, and more particularly to billing calls in a wireless communication system.

BACKGROUND OF THE INVENTION

A telephone concept known as "One Number" service that allows a person to be reached at any time, anywhere, by a single number to provide personal mobility is becoming quite popular. One method of providing such a one number telephone service is to classify telephone calls as residential, business, or cellular.

In conventional wireless networks, one number service is typically offered by either using specialized infrastructure equipment at a subscriber location or by requiring a subscriber to perform some form of manual intervention. The specialized infrastructure equipment approach usually provides a personal base station at the subscriber's home and a wireless private branch exchange at the office. However, the specialized infrastructure equipment adds extra cost and complexity to the system. In addition, to support such a service, this system requires changes to the air interface used by the wireless network, forcing subscribers to purchase new subscriber mobile units.

Another conventional system provides a one number service by requiring manual actions by subscribers. In this system, a subscriber that transitions from a mobile environment, such as in an automobile, to a residential location informs the system of the subscriber's change in location by taking a manual action, such as by pressing certain keys on the mobile unit in a fashion similar to conventional call forwarding.

The system then routes calls to the subscriber's residence. However, relaying on a subscriber's manual actions is inconvenient for many users and may cause incorrect billing, such as when a subscriber forgets to take the appropriate action.

Accordingly, there is a need for a method and apparatus to provide one number service without requiring manual intervention by the subscriber and reducing the amount of specialized infrastructure equipment used to provide the service.

SUMMARY OF THE INVENTION

In order to address this need and others, the present invention provides a method and an apparatus for billing in a wireless communication system. The method includes the steps of receiving a mobile identification number uniquely identifying a mobile unit, performing a multilateration location measurement based on a nonperiodic signal received from the mobile unit, retrieving a location zone from a memory based on the mobile identification number, comparing the multilateration location measurement with the location zone, and generating a billing record for the mobile unit.

The apparatus includes a base station, a location measurement device and a memory in communication with the base station, and a processor responsive to the base station and the memory. The base station receives a mobile identification number uniquely identifying a mobile unit. The location measurement device performs a multilateration location measurement based on a nonperiodic signal received from the mobile unit. The memory includes a location zone associated with the mobile identification number. The processor compares the multilateration location measurement with a retrieved location zone and generates a billing record for the mobile unit.

According to another aspect of the present invention, a wireless communication system is provided. The wireless communication system comprises a base transceiver station, a mobile unit location module, a transcoder responsive to the base transceiver station and the mobile unit location module, and a location storage module comprising a location function controller and a location cache.

The invention itself, together with its intended advantages, may best be understood by reference to the following detailed description, taken in conjunction with the accompanying drawings.

BRIEF DESCRIPTION OF THE DRAWINGS

FIG. 2 is a message flow diagram illustrating an example of a preferred message flow between the components of the system of FIG. 1.

FIG. 3 is a message flow diagram illustrating another example of a preferred message flow between the components of the system of FIG. 1.

DETAILED DESCRIPTION OF THE PREFERRED EMBODIMENTS

Figure 1:
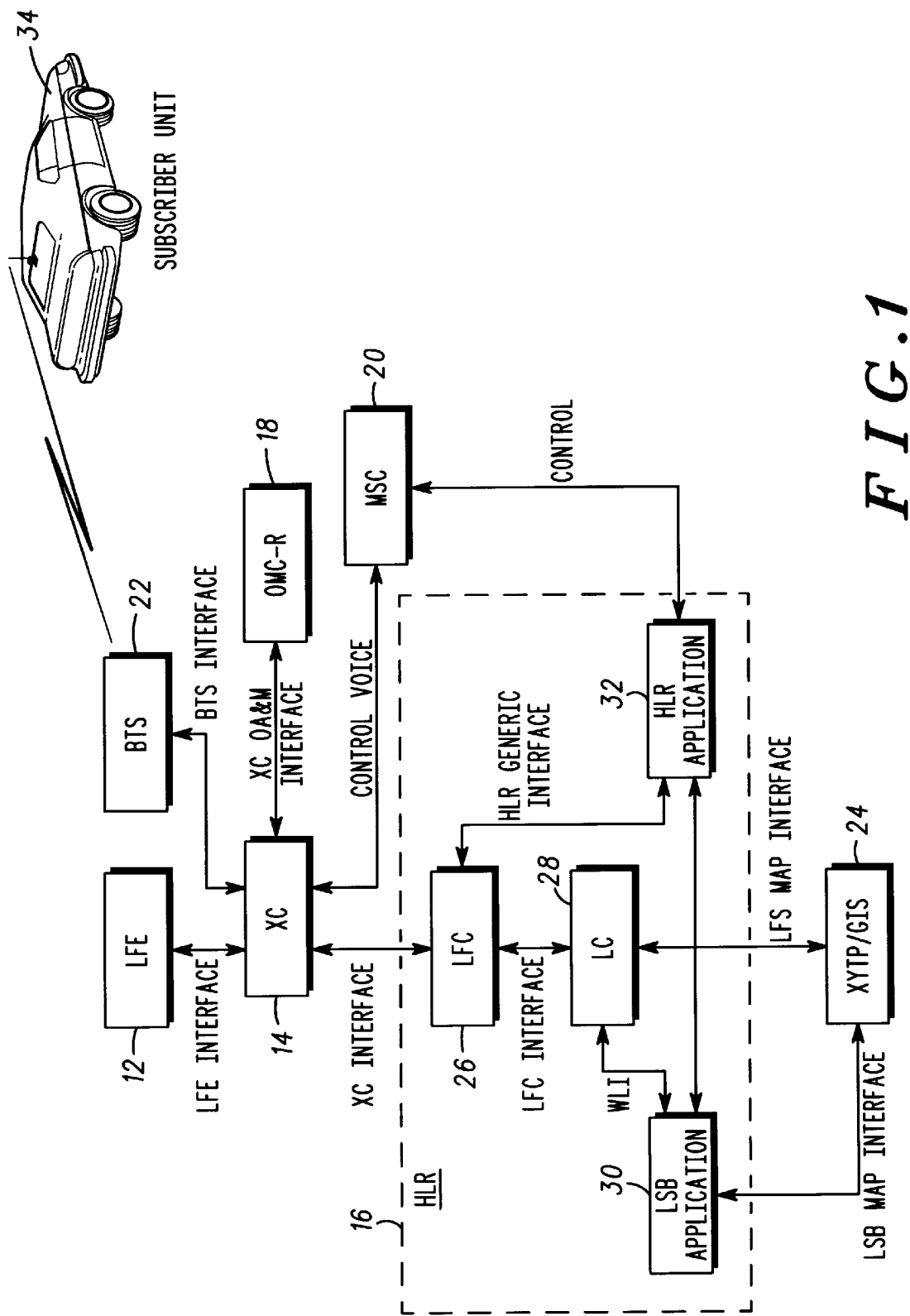
FIG. 1 is a block diagram of a preferred embodiment of a wireless communication system.

Referring to FIG. 1, a preferred embodiment of a wireless communication system 10 including enhanced location finding to perform location sensitive billing is illustrated. By performing location sensitive billing the system 10 provides new services, such as one number service. In the preferred embodiment, the system 10 includes location finding equipment (LFE) 12, a transcoder (XC) 14, a home location register (HLR) 16, an operations and maintenance center (OMCR) 18, a mobile switching center (MSC) 20, a base transceiver station (BTS) 22, and an operator workstation referred to as an XYTP/GIS 24. The HLR 16 includes various software components such as a location function controller (LFC) 26, a location cache (LC) 28, a location sensitive billing application (LSB) 30, and an HLR application 32. The LFE 12 is a conventional mobile unit location finding system such as the system described in U.S. Pat. No. 5,317,323.

Although the LFE 12 is shown connected to the system 10, it is contemplated that the location finding function could alternatively be disposed in the mobile unit. In this case, the BTS 22 in communication with the mobile subscriber unit would request location data from the mobile subscriber unit. There are many mobile subscriber units including location finding systems that use multilateration or other location techniques that are known to those of ordinary skill in the art.

The XC 14 is preferably a Motorola transcoder, and the BTS 22 is preferably a Motorola BTS. The Motorola transcoder and BTS are available as components within a Motorola SC9600 base station. The HLR 16 is preferably a Motorola HLR such as Motorola part# CGDST16SK20041. The OMCR 18 is preferably a Motorola Operations and Maintenance Center that is provided with a standard Motorola CBSC or GSM offering. The MSC 20 is preferably a Motorola MSC found in the Motorola EMX 2500™ cellular system.

It should be noted that the system 10 depicted in FIG. 1 reflects a generic location services architecture that may provide a variety of location based services, other than one number service, such as emergency 911 for wireless, Fleet management, and Mobile Yellow Pages.

During operation, the LFE 12 monitors dedicated control channels of the radio system for a nonperiodic signal representing subscriber accesses. Upon detection of a nonperiodic signal, such as a subscriber access message, the LFE 12 computes angle of arrival and time of arrival data characterizing a signaling burst for the access. By measuring a subscriber's location based on a nonperiodic signal received from the subscriber unit, an approximate location may beneficially be determined during call setup before the subscriber is in communication with another party. This information is then forwarded to the XC 14 over a dedicated control link embedded in a BTS interface used between the BTS 22 and XC 14. The LFE 12 may also be commanded to perform voice channel signal characterization. In this case, LFE 12 is informed via the dedicated control link of a desired frequency to measure. LFE 12 then performs the aforementioned angle and time of arrival calculations and forwards the resulting data to the XC 14. Although only one LFE 12 is shown in FIG. 1, there are preferably multiple LFE's in the system 10.

The BTS 22 is responsible for standard radio interface management associated with the air interface used to communicate with subscriber units. The BTS 22 may share with the LFE 12 a physical communications link (T1/E1) supporting the LFE 12 and BTS 22 interface to the XC 14. Alternatively, the BTS 22 and LFE 12 may be embedded in the same hardware platform. There are preferably multiple BTS's 22 within the system 10, although only one is shown for illustrative purposes.

The XC 14 is responsible for termination of T1 lines emanating from the various base sites 22. This termination consists of both audio and control. Audio information is transcoded by the XC 14, converted from subrate to full rate voice, and directed to the MSC 20. The XC 14 also terminates control links, typically employing a LAPD protocol, both for each BTS 22 and for the LFE 12. The control links are used for passing location, call processing, and O&M information between the sites and the XC 14. The XC 14 has a communications interface, typically a conventional SS7 interface, to the HLR 16 for purposes of directing location data. Since multiple LFE 12 and BTS sites 22 terminate on a single XC 14, it is preferable to bundle location data from multiple LFE's 12 to improve I/O throughput. For example, rather than relaying individual location data from each LFE 12 back to the HLR 16, the XC 14 bundles groups of location data from a plurality of LFEs 12 and forwards that bundled data as a whole to the HLR 16, reducing overall I/O requirements.

The OMCR 18 is responsible for management of the BTS 22 and LFE 12 sites and provides maintenance functions, such as alarm reporting, download, and device control.

The MSC 20 serves the traditional role of cellular switches, providing call routing, billing, and handoff coordination. The MSC 20 supports an off-board, or stand-alone subscriber database (HLR) 16 that it queries for subscriber and call routing data. The MSC 20 may provide notification, via tone, to the subscriber when calls are executed in a high billing rate service zone. Lastly, the MSC 20 may support the one number billing function, incorporating zone tariffing information into detailed billing records. The MSC 20 may also provide physical interconnect between the XC 14 and HLR 16 via nailed connections in certain installations.

The LFC 26 is a controller application for coordinating on-demand location requests (typically voice channel locations) and processes both autonomous and on-demand LFE 12 location data using lateration location techniques. LFC 26 receives data from the LFE 12 and calculates a resultant latitude, longitude and confidence data. For on demand location requests, the LFC 26 assigns and instructs at least one of the LFEs 12 to measure a mobile subscriber location, via the XC 14.

The LC 28 serves as a repository, or database, for location data. Location information calculated by the LFC 26 is stored in a location cache within the LC 28 for later use. Mobile identity, time of location update, and location data are all maintained in the database. The location cache is typically queried on a per subscriber basis by applications requiring location data for a particular service, such as the one number service. The location cache also supports a subscription service, allowing applications to subscribe for automatic notification of detected location changes for any particular subscriber. The subscription service is useful for real time applications such as Fleet Management.

The LSB application 30 is the consumer of the location data, and provides support for the one number service. It is typically invoked by the HLR application 32 upon initiation of a call by a user who has subscribed to the one number service. The HLR application 32 informs the LSB 30 of the caller identity. The LSB 30 then determines if the caller is operating within a predefined zones or in the macrocellular environment and then informs the mobile of the charge disposition based on the subscriber's serving zone. The LSB 30 may then generate a billing record characterizing the zone of access for the call.

The HLR application 32 includes a subscriber database for the system 10. Typically, subscriber entries reside in the HLR application 30 along with a subscribed feature set. The HLR 32 is queried by the switch 20 each time a call is made involving subscribers of the service. Based on features of the subscriber, HLR 32 may alter the call flow via the switch 20. For example, HLR 32 may instruct the switch to play tones, or generate billing records. HLR application 32 interfaces to the LSB application 30 via messaging, or triggers associated with the subscriber feature set. HLR application 32 also interfaces with the MSC 20 for call control purposes.

The system 10 provides a location based billing service. The system 10 allows a user to create virtual zones of operation, such as 'home', 'office', and 'cellular', without introducing any specialized infrastructure or handsets. The same subscriber unit may be used in each zone, and the system determines a different billing rate for a call based on the subscriber unit's location. The system 10 provides different domains of operation with different tariffs by subdividing the cellular network to support individual subscriber needs. From the network or call delivery perspective, system 10 provides a single solution for a variety of environments facilitating improved one number service.

When the user subscribes to the service, two methods of zone assignment are possible. The first, or static, method involves the user informing the service provider of the physical address where they desire service (i.e., street address). The operator then enters this information through the XYTP-GIS element, where the address is stored in the database as a latitude/longitude location for that particular subscriber zone. For our example, two zones are entered—'Home and Business'. Areas outside of these two are considered the 'cellular' zone.

The second form of zone assignment is more dynamic in nature. After the user has signed up for the one number service via the service provider, the user specifies zones via feature codes (e.g., *71). When the code is dialed, the system 10 determines the location of the subscriber at that time and stores this information into the database as the location of the selected zone for this particular subscriber. For example, the subscriber may dial *71 at home, defining the home zone, and *72 at work for defining the work zone.

When a location for at least one zone has been stored in the system 10, the billing function may be activated. Each time the subscriber initiates a call, the system 10 preferably informs the subscriber, via tone or digital message, of the current zone of operation based on the subscriber's current location. The system 10 generates billing information based on a tariff rate for the current zone, allowing a billing system to differentiate for each call the appropriate tariff based on the current zone. The caller is preferably allowed to disconnect the call without charge for a certain time period if the subscriber is not in the desired zone. For this additional reason, it is preferred to perform location measurements based on a subscriber access message, or alternatively on a termination message for a landline to mobile call, so that the subscriber may be informed of the current zone before the subscriber begins being charged for the call.

The system 10 provides one number service to subscribers at various locations, such as at home, at work, or while driving, at various billing rates without specialized cellular infrastructure equipment and without requiring manual user operation. There is no differentiation, from the point of view of the system 10 to delivering a call inside or outside the macrocellular environment. Further, a call is delivered to wherever the mobile is currently located. No time of day routing or alias based number routing is required as is necessary in at least some conventional systems.

Basic information flow between elements is highlighted in the attached 'Location Update' data flows, as shown in FIGS. 2 and 3. FIG. 2 depicts an access by the mobile for purposes of making a call. Upon receiving a nonperiodic signal from the subscriber unit such as a control channel access 50, the LFE 12 calculates angle and time information (TOA/AOA) characterizing the access. Alternatively, other suitable location techniques and associated information may be used such as time difference of arrival (TDOA). In an alternative embodiment, it is contemplated that the mobile unit determines an approximate location and transmits a message to the base station 22 that contains the location information. One example of a system to perform such a location measurement would combine a standard global positioning system (GPS) receiver into the subscriber unit. Such a combined GPS receiver and subscriber unit is known to those of ordinary skill in the art. Any description below referring to TOA or AOA is equally applicable to such other location techniques. This location information 62 is forwarded via the transcoder 14 to the LFC 26. Note that the transcoder 14 may bundle together multiple LFE location reports before forwarding them to the LFC 26 in order to improve overall system I/O throughput. The LFC 26 correlates the TOA or AOA reports for the particular mobile accessing the system 10 and uses this information in multilateration calculations to create location (lat./long.) data 60. The location data 60 is then forwarded to the LC 28, where it is stored for later use.

Two modes of operation are possible from this point for use of the data 60, and each will be described below. The particular mode chosen is based upon the availability of interactive call control capability within the MSC 20.

In the first mode, shown in FIG. 2, an 'Intelligent Network' (IN) call model is used. The IN call model allows interactive call control, preferably with Motorola's Distributed Mobile Exchange (DMX) protocol serving as the control protocol. When a mobile access 50 occurs, the BTS 22 generates a 'service request' message 52 and sends it to the MSC 20. The service request message 52 includes a mobile identification number identifying the mobile unit recovered from the control channel access 50 from the identified mobile unit. When the service request message 52 reaches the MSC 20, a call trigger, or query, is launched to the HLR platform 16. The HLR 16 informs the LSB 30 of the access via the 'LSB Call' message 58 and awaits further processing instructions. The LSB 30 queries the LC 28 for the location information by sending a 'Req. Loc. data' message 54. The location data 60 is returned to the LSB 30 and the LSB 30 determines what billing zone the subscriber is located in. The LSB 30 informs the HLR 16 to proceed on the call, with the HLR 16 then informing the MSC 20 to continue processing via a 'Val. Rsp.' message 66. An interactive control capability within the MSC 20 allows the injection of tones or voice messages to the caller before completing the call. In this manner the caller may be audibly informed of the serving zone rate associated with the billing zone.

A second mode of operation without interactive call control is shown in FIG. 3. In this model, the LSB 30 subscribes to the LC 28 for location update information for all subscribers to the LSB feature. Once location data 60 is received at the LC 28, the location data 60 for subscribing users is automatically forwarded to the LSB 30 for purposes of billing record generation and optional subscriber rate message notification, using a 'Subscribed Loc.' message 68.

Figure 4:
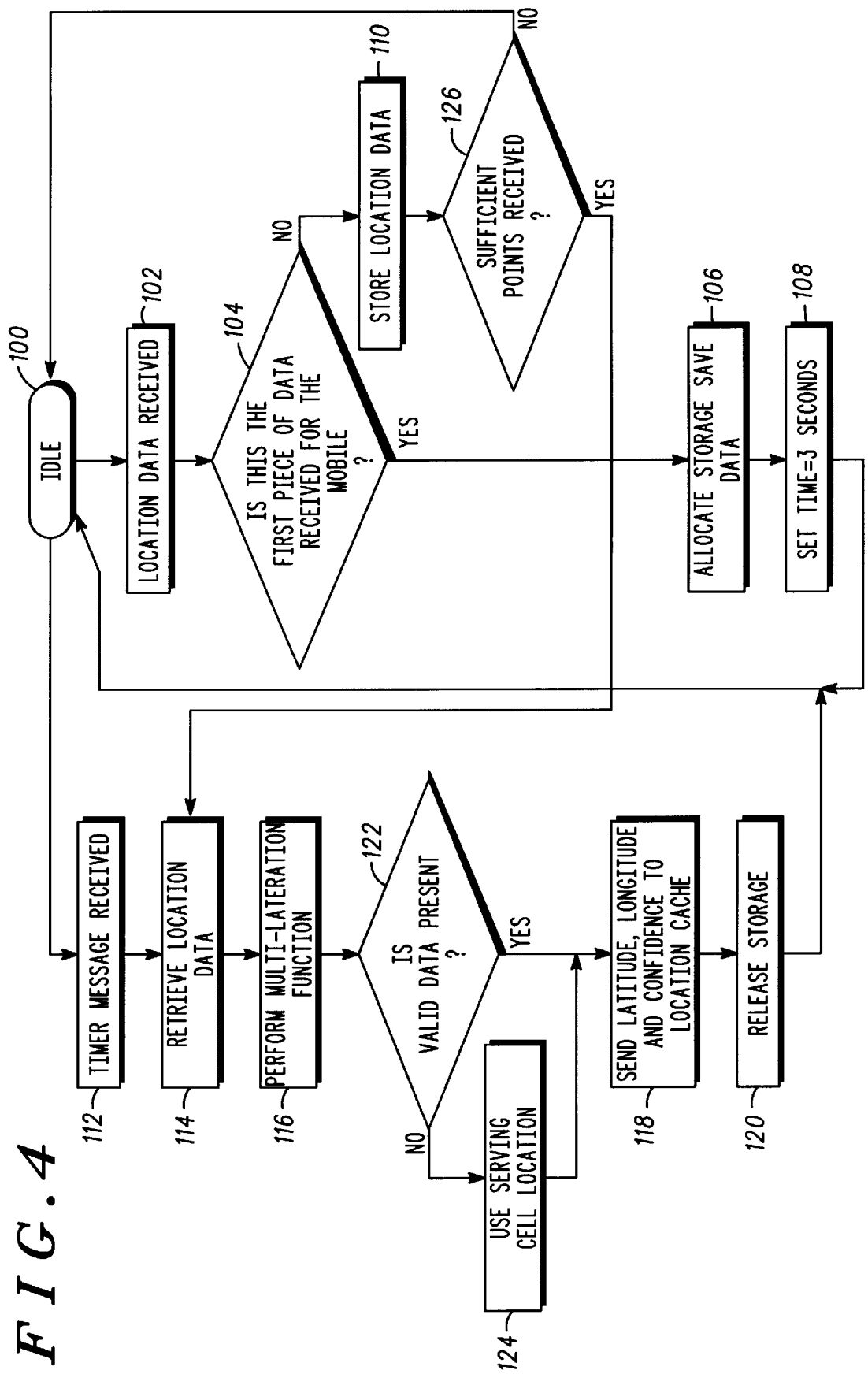
FIG. 4 is a flow chart illustrating a preferred method of operation of the location function controller of the system of FIG. 1.

FIG. 4 is a flow chart illustrating a preferred method of operation for the Location Function Controller (LFC) 26. Processing begins from the idle state 100. When raw (i.e., angle of arrival, time of arrival from a single site) location data is received from the LFE 12, a message is parsed at 102. At this point, it is determined if this is the first piece of location data received in the multilateration sequence at decision step 104. If it is the first piece of data, flow moves to step 106 and dynamic memory is allocated to temporarily store the data until other sites report in and lateration may be performed. From there, control moves to step 108, where an overall timer, such as a three second timer, is set and processing then returns to the idle state 100. The timer is set based on the amount of time allowed to collect the location data points. If, at decision step 104, it is determined that this is not the first piece of data for this particular location calculation, flow moves to step 110, where a new data point is stored with the previously collected points. Referring to step 126, if a sufficient number of location data points has been received, such as at least three location data points in a TDOA system or at least two location data points in a TOA/AOA system, then processing continues at step 114. Otherwise, control returns to idle, at step 100.

When the timer expires, flow moves to step 112. All of the data collected up to that point is then retrieved, step 114, and multilateration calculations begin. The result of these calculations is location information, such as a latitude, longitude, and confidence factor, depicted in step 116. If no valid data is present, step 122, a default location, corresponding to the location (latitude and longitude) of the serving cell, is assigned, step 124. If valid date is present, step 122, control then flows to step 118. The location information is then formatted into a message and forwarded to the LC 28 at step 118. Dynamic resources are then released, step 120, and flow returns to the idle state, at step 100.

Figure 5:
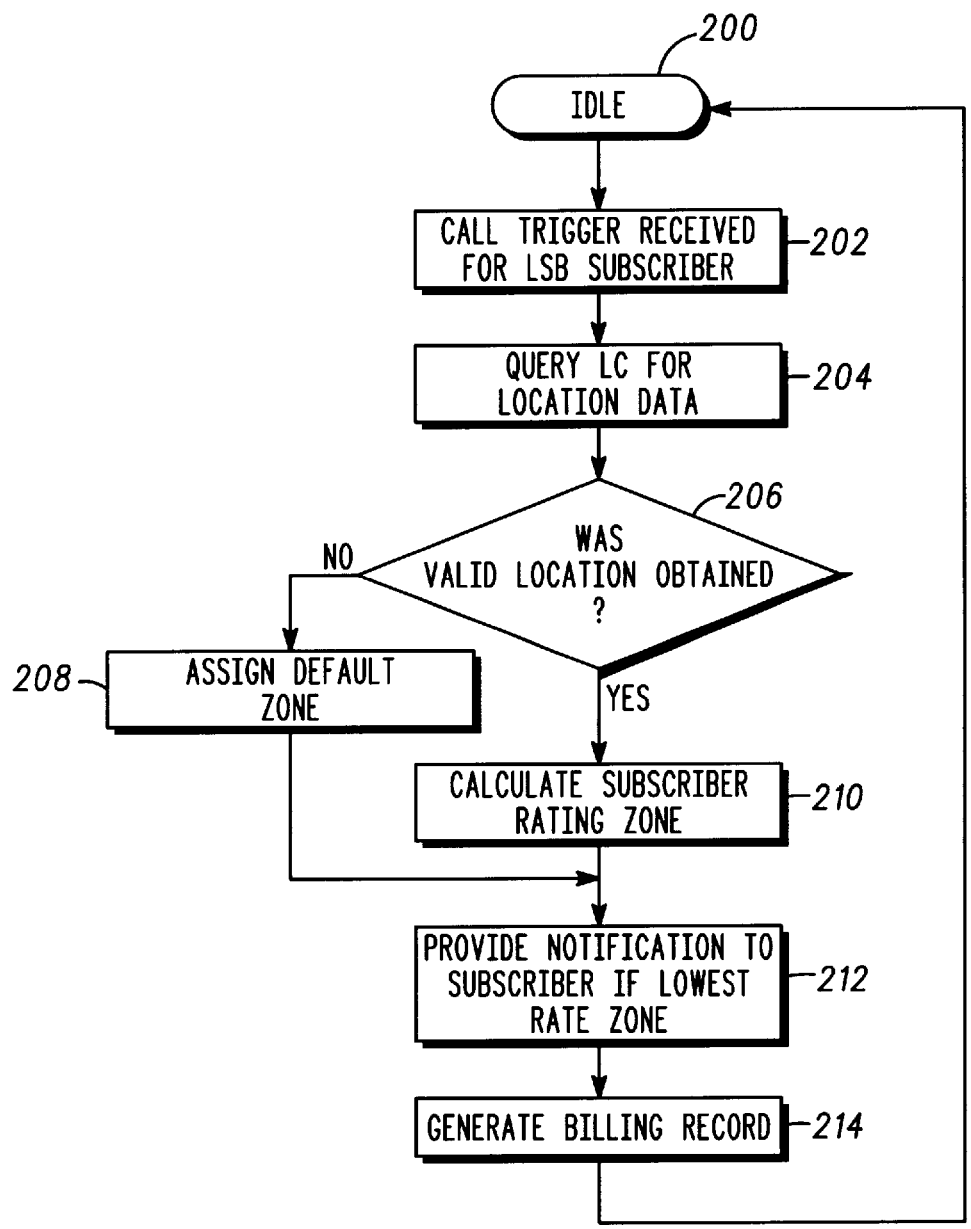
FIG. 5 is a flow chart illustrating a preferred method of operation of the location sensitive billing application of the system of FIG. 1.

FIG. 5 is a flow chart illustrating a preferred method of operation for the LSB 30. Processing begins at 202, with the receipt of a trigger from the call processing function, indicating a call has been made or received by a subscriber who has the LSB feature active. The LSB 30 then obtains location information from the location cache, or LC 28, at step 204. The LSB 30 then determines if the data received is valid, decision step 206, based on a timestamp indicating reliability of location data. If no valid location data was obtained, step 206, the system assigns a default rating zone, step 208, and proceeds to step 212. If valid location data was obtained, step 206, the subscriber rating zone is determined relative to this data, step 210, preferably as a straight-line distance calculation comparing the subscribers location to the rating zones that were predetermined for the subscriber. A sort routine determines which zone the point, defined by the latitude and longitude, is located within. Once a zone is located, notification is preferably provided to the subscriber if the subscriber is outside the lowest rate zone. This may be done via either audio or visual means, and is shown at step 212. Lastly, a billing record is generated, containing at least the mobile identification, zone of access, time, and date, at step 214. At this point, the application returns to the idle state, at step 200.

Figure 7:
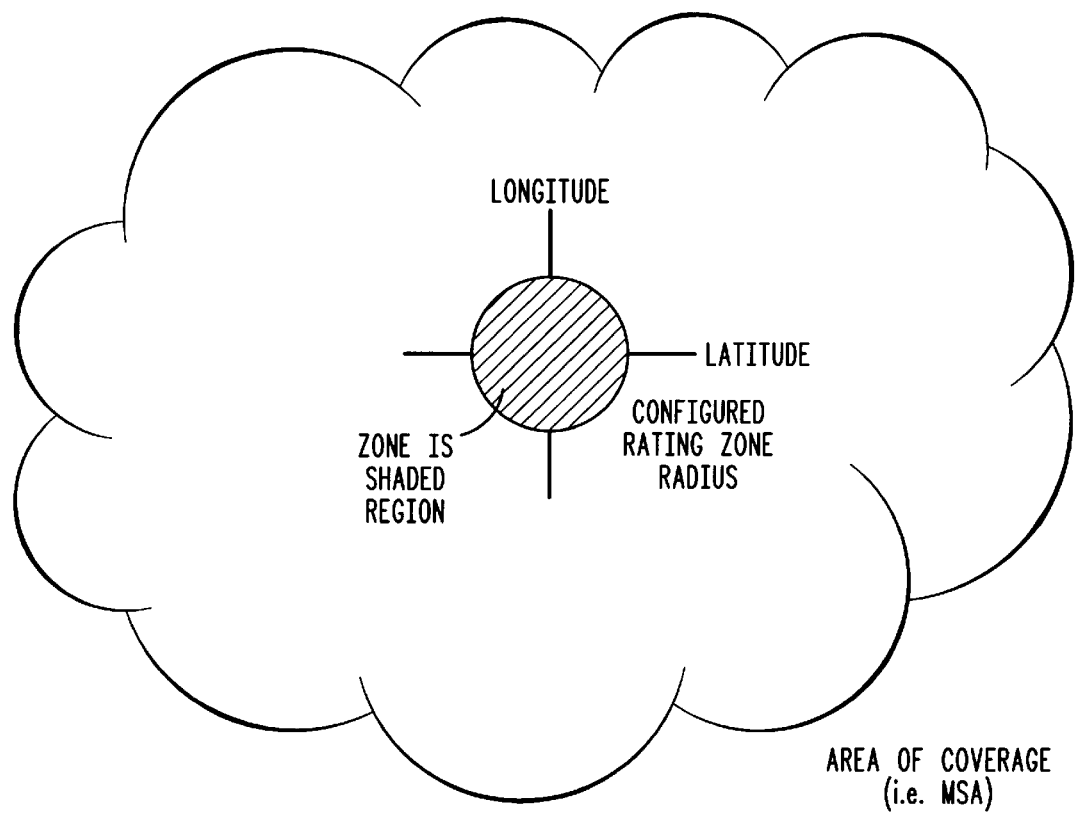
FIG. 7 is a diagram illustrating an exemplary zone layout for the system of FIG. 1.

In the preferred embodiment, a subscriber zone is defined as a latitude, a longitude and a configured rating zone radius. The configured rating zone radius typically relates to the uncertainty of the measurement equipment and may be set by the operator given the behavior of location infrastructure across the system. FIG. 7 depicts an example of a particular location zone including a configured rating zone radius. Information is stored for each subscriber in the database for each zone for each subscriber. In the one number service feature, there are two zones for each subscriber (home, work). As mentioned earlier, the Lat. and Long. data may be entered at the time of subscription to the service, with the user providing address information, or it may be entered dynamically through feature codes (i.e., *71), with the system geolocating the subscriber at the time of feature code receipt, and then storing the data in the database to characterize the subscriber zone. In the former case, where the user provides street address information, the XYTP-GIS 24 translates that information into a latitude and longitude for zone definition.

When the subscriber subsequently initiates or receives a call, a location operation is performed, and the latitude and longitude calculated at that time are compared to the 'circle', or 'circles' stored in the database. If the data is within that circle, the user is considered operating within the coverage of that particular zone. If the user is currently not located in any of the stored zones, he is assumed to be operating in the macrocellular environment.

The LSB operation described previously (FIG. 5) has the application generating a billing record characterizing the location zone. The information preferably contained in the record is as follows:

Mobile identification number
Date
Time of day
Cell of access
Sector of access
Zone of access
Record Correlator The record correlator is used to simplify the matching of the detailed billing information typically generated in the MSC 20 with the zone record generated by the application. This step is typically done as a post processing, or off-line, operation. The 'zone of access' field is the zone determined as described above and is used for rate calculation. The remaining information is also used for record correlation between MSC 20 and HLR 16.

Note that it is possible, based on the capabilities of the switch 20, to have the zone information integrated into the detailed billing record generated by the switch 20, thus obviating the need for record generation by the LSB application 30.

Figure 6:
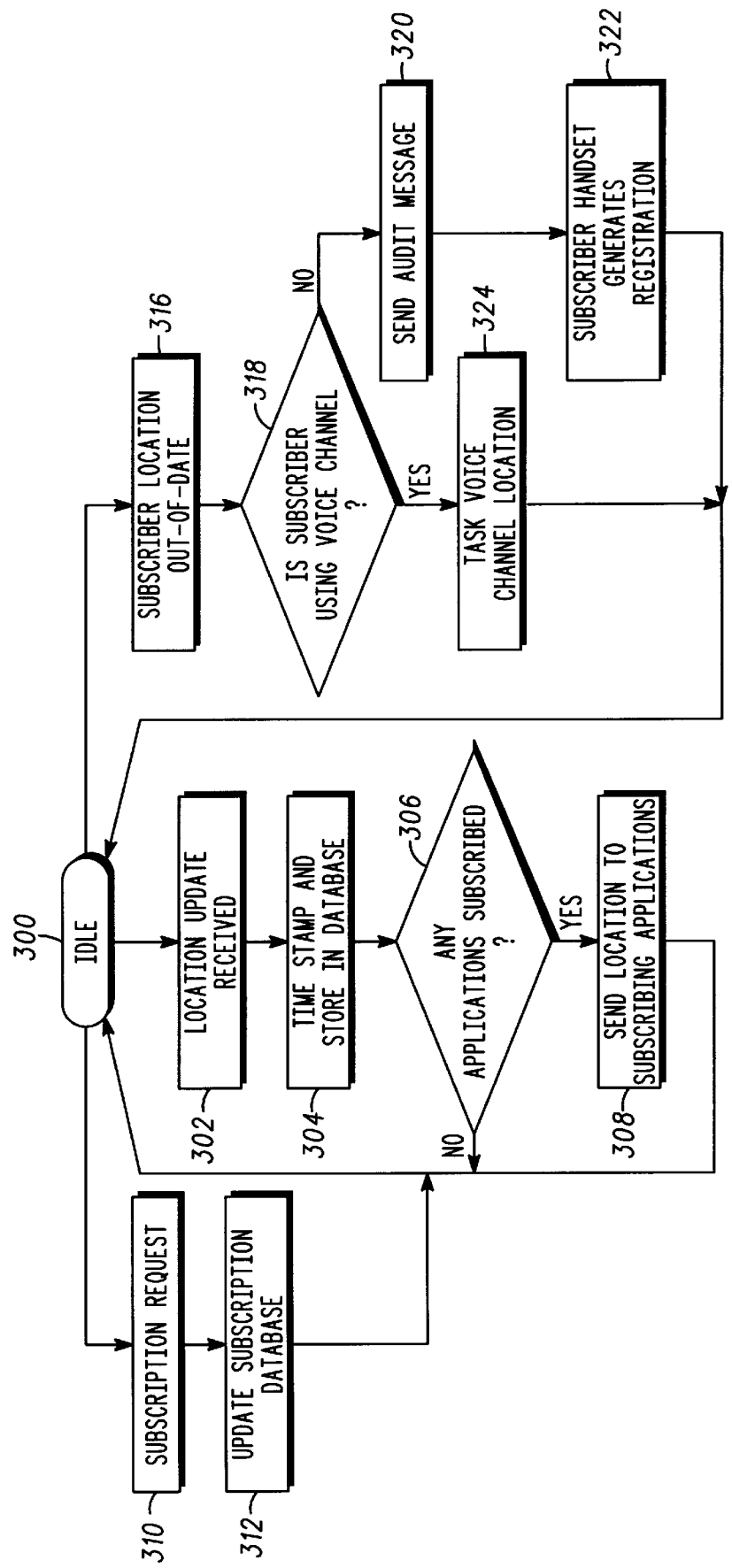
FIG. 6 is a flow chart illustrating a preferred method of operation of the location cache of the system of FIG. 1.

FIG. 6 is a flow chart depicting a preferred method of operation of the LC 28, which stores location data points in the system 10. Flow begins in the idle state, denoted as step 300. Upon receipt of location information 42 from the LFC 26, processing begins, at step 302. The location information is time-stamped and then stored in a database based upon the mobile subscriber number, step 304. One of the facilities offered by the LC 28 is that of subscription, or allowing an application to be notified whenever location information is updated for a particular subscriber. This leads to decision step 306, which determines if any applications have subscribed for location update notification on this particular subscriber. If not, flow returns to the idle state, step 300. If so, flow moves to step 308, where location information is sent to the subscribing applications, informing them of the subscriber's current location. Control then returns to the idle state, step 300. The second processing leg associated with this function deals with the subscription process. In the idle state 300, a subscription request from an application may be received, at step 310. Control is then moved to step 312, where a subscription database is updated. This database contains a list of subscribing applications as well as other data pertinent to the needs of the subscribing service, such as maximum aging of the location data. After the database update, control returns to the idle state, step 300. The third processing leg occurs when a particular subscriber's location is considered "out-of-date" by a registering application. In the idle state 300, a time-out message is received for a subscriber, at step 316. The HLR 32 is queried at step 318 to determine whether the subscriber is currently using a voice channel. If a voice channel is not in use by the subscriber, control advances to step 320, where the HLR 32 is directed to cause BTSs 22 proximate the subscriber unit 34 to generate an "Audit" message, which is received by the subscriber unit, causing a "Registration" message to be generated, step 322 which subsequently causes updated location information to be generated; control then returns to the idle state, step 300. If a voice channel is in use by the subscriber, control advances to step 324, where the voice channel information for the subscriber is sent to the LFC 26 and hence to the appropriate LFE's near the subscriber unit. The LFEs then "tune" to the indicated voice channel, locate the subscriber, and generate updated location information; control then returns to the idle state, step 300.

Further advantages and modifications of the above described apparatus and method will readily occur to those skilled in the art. For example, it may be desirable to reduce fraud by verifying a mobile identification number, such as by querying the mobile unit for a personal identification number. If the received personal identification number does not match a stored number, the subscriber may be denied service. The verification operation may only be performed when the subscriber is outside a predefined personal location zone, such as the home zone described above. As another example, a service could be provided that disallows calls when a subscriber is outside a predetermined zone. Such a restrictive use service may provide a flexible alternative to conventional landline service. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of billing in a wireless communication system comprising the steps of:

receiving a mobile identification number identifying a mobile unit;

performing a multilateration location measurement based on a nonperiodic signal received from the mobile unit;

retrieving a location zone from a memory based on the mobile identification number, the location zone designated by a feature code which is transmitted from the mobile unit;

comparing the multilateration location measurement with the location zone; and generating a billing record for the mobile unit.

2. The method of claim 1, wherein the step of generating the billing record is responsive to the step of comparing and wherein the nonperiodic signal comprises a mobile unit access message.

3. The method of claim 1, further comprising the step of verifying the mobile identification number by querying the mobile unit for a personal identification number.

4. The method of claim 1, further comprising the step of notifying the mobile unit of the location zone.

5. The method of claim 1, wherein the location zone is selected from a group of location zones where each location zone in the group has a different billing rate.

6. The method of claim 5, wherein the billing record is responsive to the billing rate of the retrieved location zone.

7. An apparatus for billing calls in a wireless communication system comprising:

a base station receiving a mobile identification number uniquely identifying a mobile unit;

a location measurement device in communication with the base station, the location measurement device performing a multilateration location measurement based on a nonperiodic signal received from the mobile unit;

a memory in communication with the base station, the memory including a location zone for the mobile identification number, the location zone designated by a feature code which is transmitted from the mobile unit;

a processor responsive to the base station and the memory, the processor comparing the multilateration location measurement with a retrieved location zone; and the processor generating a billing record for the mobile unit.

8. The apparatus of claim 7, wherein the processor generates the billing record in response to the comparison between the multilateration location measurement and the retrieved location zone and wherein the multilateration location measurement is based on time of arrival and angle of arrival data associated with the nonperiodic signal.

9. The apparatus of claim 7, wherein the processor generates the billing record in response to the location zone.

10. The apparatus of claim 7, wherein the base station notifies the mobile unit of the location zone.

11. The apparatus of claim 7, wherein the location zone is selected from a group of location zones where each location zone in the group has a different billing rate.

12. The apparatus of claim 11, wherein the billing record is responsive to the billing rate of the retrieved location zone.

* * * * *